United States Patent [19]
Finn

[11] Patent Number: 5,772,354
[45] Date of Patent: Jun. 30, 1998

[54] HANDLE SUPPORT

[75] Inventor: Arnold H. Finn, Farmington, Conn.

[73] Assignee: Taco Fasteners Inc.

[21] Appl. No.: 617,543

[22] Filed: Mar. 19, 1996

[51] Int. Cl.[6] ........................................ B25G 3/00
[52] U.S. Cl. ............................ 403/262; 403/256; 403/189; 56/400.01
[58] Field of Search ..................................... 403/256, 261, 403/263, 187, 189, 192, 230, 233, 262, 407.1, 405.1; 56/400.01, 400.17, DIG. 18; 172/371; 15/175, 159.1

[56] References Cited

U.S. PATENT DOCUMENTS

| | | |
|---|---|---|
| 566,787 | 9/1896 | McIlhany . |
| 1,380,521 | 6/1921 | Blasingame . |
| 1,402,485 | 1/1922 | Fredriksen et al. ................ 403/189 X |
| 1,458,095 | 5/1923 | Drake . |
| 1,541,710 | 6/1925 | Hill . |
| 1,872,534 | 8/1932 | Wallin ................................ 403/262 X |
| 2,055,986 | 9/1936 | Potemkin ............................ 56/400.17 |
| 2,131,612 | 9/1938 | Campbell . |
| 2,860,360 | 10/1958 | Leavelle . |
| 2,922,179 | 1/1960 | Lundgren ........................... 403/189 X |
| 4,239,413 | 12/1980 | Wludyka . |
| 4,850,075 | 7/1989 | Kresse et al. . |
| 5,094,564 | 3/1992 | Tedrick . |
| 5,309,654 | 5/1994 | Mathis . |
| 5,337,440 | 8/1994 | Vosbikian et al. . |
| 5,462,459 | 10/1995 | Childs ................................... 439/843 |

*Primary Examiner*—Kenneth J. Dorner
*Assistant Examiner*—William L. Miller
*Attorney, Agent, or Firm*—Ira S. Dorman

[57] ABSTRACT

A one-piece brace includes a body portion and a pair of elongate leg portions. The leg portions are joined to the body portion at areas of relative flexibility, which provide joints about which the leg portions can turn for displacement. The brace can be packaged and shipped in a compact configuration, and the leg portions can be spread in such manner so as to minimize their distortion and to maximize the level of reinforcement imparted to the implement on which the brace is installed.

20 Claims, 3 Drawing Sheets

HANDLE SUPPORT

BACKGROUND OF THE INVENTION

It is common practice to provide support structure on push brooms, rakes, snow-removal tools, squeegees, and like implements to reinforce the connection between the handle and the operating head. Various forms of such supports are disclosed in prior art references, exemplary of which are the following U.S. patents: U.S. Pat. No. 566,787; No. 1,380,521; No. 1,458,095; No. 1,541,710; No. 2,131,612; No. 2,860,360; No. 3,876,318; No. 4,239,413; No. 4,850,075; No. 5,094,564; No. 5,309,654; and No. 5,337,440.

Despite the activity in the art indicated by the foregoing, a need remains for an implement handle-supporting brace that is of uncomplicated construction and inexpensive manufacture, is compact for facile packaging and shipping, and is convenient and effective to install and use.

SUMMARY OF THE INVENTION

Accordingly, it is a broad object of the present invention to provide a supporting brace that satisfies the foregoing need. Related objects are to provide a metal blank, and a method utilizing same, by which a plurality of such braces can be produced readily and efficiently.

It has now been found that certain of the foregoing and related objects of the invention are attained by the provision of a one-piece, integrally formed brace comprising a body portion and a pair of elongate leg portions, normally of the same length. The body portion extends generally on a first axis, and is constructed for attachment to the handle of the implement on which the brace is to be used. Both leg portions extend in the same general direction from the body portion, and are constructed for attachment to the opposite, laterally extending portions of the operating head of the implement, to which the handle is substantially perpendicular. A limited area of relative flexibility is provided at the juncture of each leg portion with the body portion, which areas function as joints about which the leg portions can turn, or partially rotate, for displacement relative to the axis on which the body portion extends.

In a specific form of the brace, the body portion will be of generally U-shaped cross section, taken in planes transverse to its axis, and the leg portions will desirably extend substantially parallel to one another (prior to installation). The areas of relative flexibility will preferably comprise lines of reduced thickness, relative to the thickness of adjacent areas, formed into the material from which the brace is fabricated; normally, the brace will be made of metal, and the reduced thickness areas will be produced by coining. Alternatively (or in addition thereto), the relatively flexible areas of the brace may be provided by increased stiffening of the leg portions from points adjacent such areas; for example, each leg portion may be formed with a longitudinally extending stiffening rib element. In most instances, each of the leg portions will have a tab element formed on its free, outer end, the tab elements diverging from one another and from the body axis, in the outward direction, and serving as means for attachment of the brace to the implement head.

Other objects of the invention are attained by the provision of a one-piece metal blank for forming a plurality of supporting braces, the blank comprising a plurality of generally V-shaped components, each including a body portion and a pair of divergently extending leg portions. A plurality of connecting components join the body portions of adjacent V-shaped components in a generally nested, axially aligned relationship to one another.

Additional objects of the invention are attained by the provision of a method for the production of a plurality of supporting braces, utilizing a one-piece metal blank of the character described. In accordance with the method, the blank is trimmed to remove the connecting components, as well as other metal that is extraneous to the V-shaped components. Before, after, or simultaneously with the trimming step, the metal of the blank is formed so as to define joints at the junctures of the leg portions with the body portion of each V-shaped component, such as by coining of the metal and/or by forming longitudinally extending stiffening rib elements in the leg portions; in carrying out the method, the blank may also be formed so as to impart a U-shaped cross section to the body portion of each of the braces.

DETAILED DESCRIPTION OF THE DRAWINGS

Turning now in detail to FIGS. 1 through 4 of the drawings, therein illustrated is a supporting brace embodying the present invention and consisting of a body portion, generally designated by the numeral 10, and a pair of leg portions each generally designated by the numeral 12. The body portion 10 has a generally U-shaped cross section, taken in planes transverse to the longitudinal axis "X" of the brace, to which axis the leg portions 12 also extend generally parallel.

Figure 1:
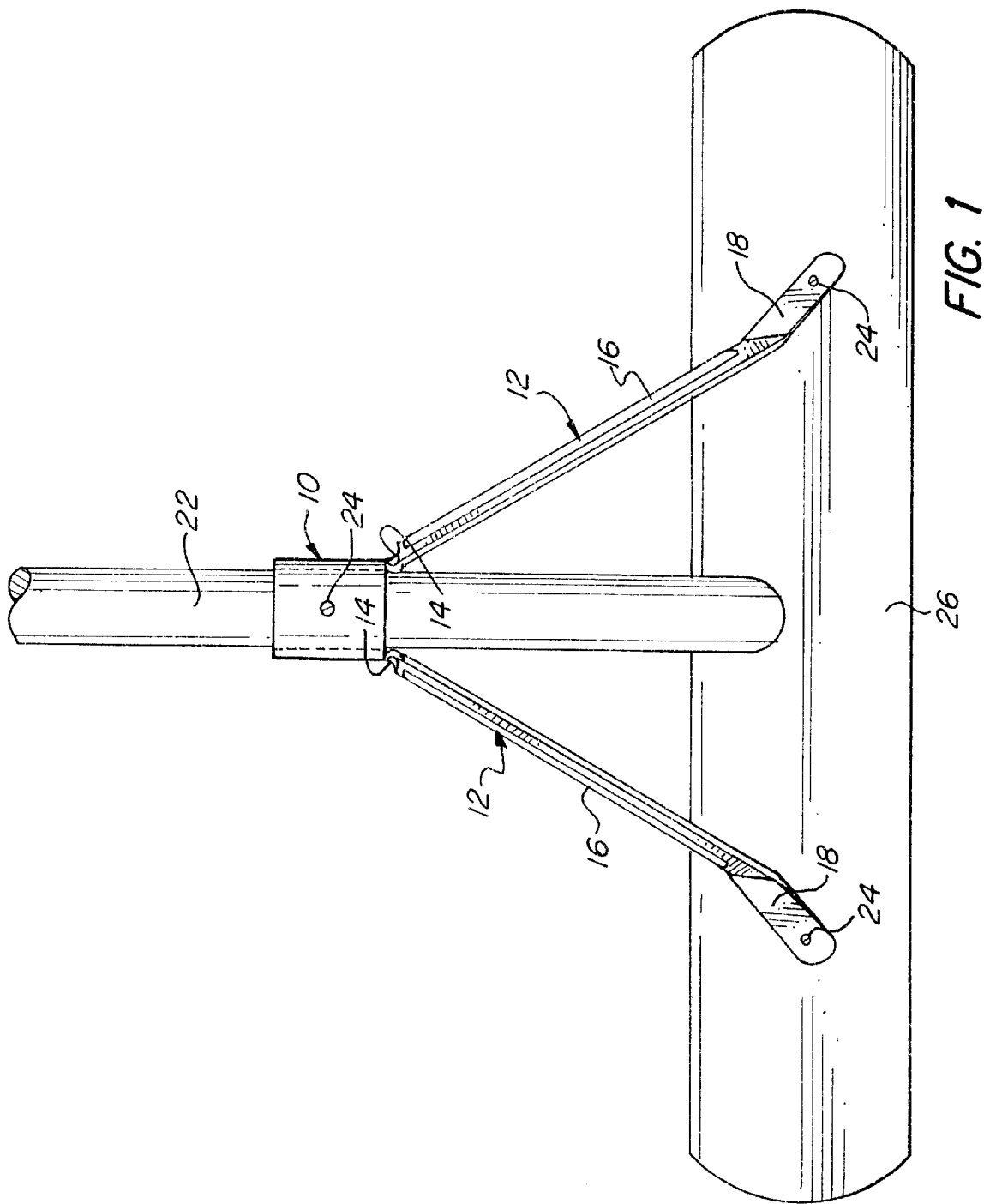
FIG. 1 is a plan view of a supporting brace embodying the present invention, attached to a fragmentarily illustrated push broom.
Figure 4:
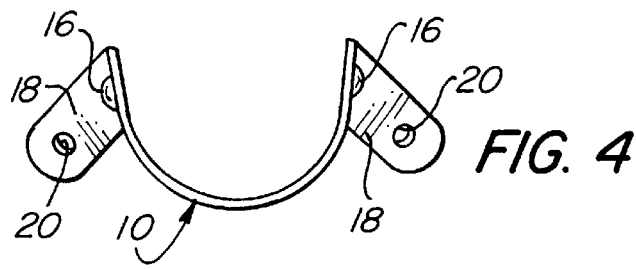
FIGS. 2, 3, and 4 are front, side and end views, respectively, of the brace depicted in FIG. 1, drawn to an enlarged scale and showing the leg portions in an unspread, as-manufactured, generally parallel relationship to one another.

The leg portions 12 are of equal length and are attached to the body portion 10 by lines 14 of coining, which extend across the width of each leg and form hinge-like joints about which the legs can turn. Each leg portion 12 is also formed with an elongate rib 16, which commences at a point adjacent the coined line 14 and extends along most of its length. As will be appreciated, the ribs 16 strengthen the leg portions 12 and reinforce them against bending, thereby cooperating with the lines of coining 12 to limit deformation of the leg portions under spreading force and to ensure that displacement occurs in only limited zones or areas, i.e., at the junctures with the body portion 10. The free ends of the leg portions 12 are bent to produce divergent tab elements 18, and apertures 20 through the body portion 10 and the tab elements 18 receive screws or other fasteners 24 for attachment of the brace to the broom handle and head, respectively, as depicted in FIG. 1.

Figure 2:
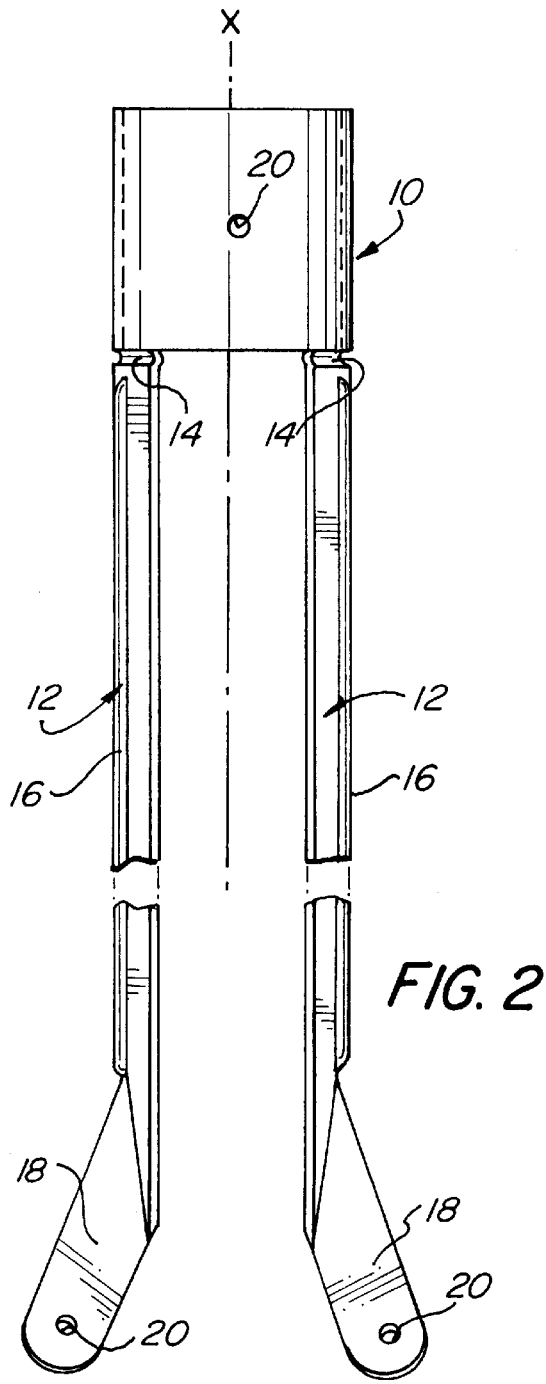
Figure 3:
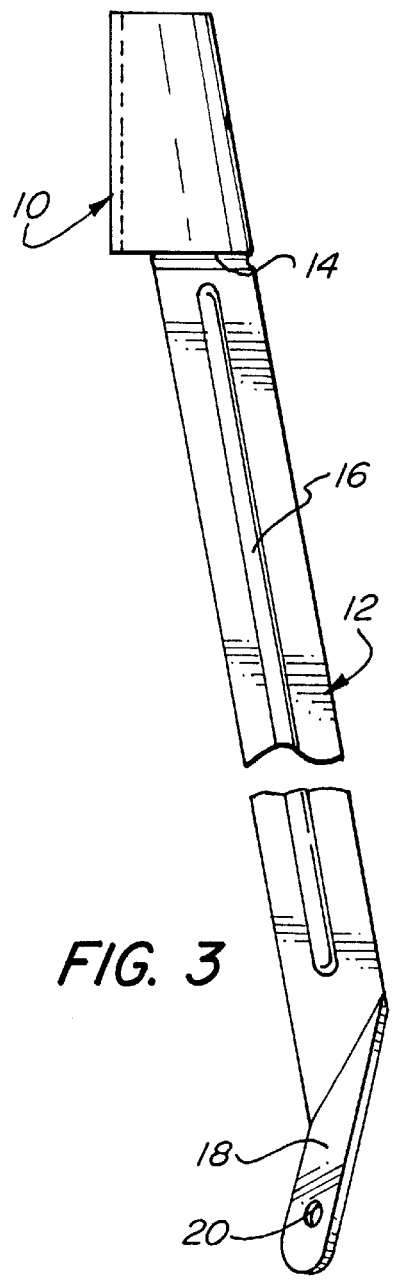

It can be seen that, as installed, the leg portions 12 are spread from the generally parallel, as-manufactured condition shown in FIG. 2. It can also be seen that the body portion 10 is engaged upon and fastened to the handle 22 of the broom, and that the bent tab elements 18 are secured in surface contact with the top of the broom head 26.

In addition to cooperating in localizing distortion of the leg portions 12 under spreading force, it will be appreciated that the rib elements 16 render the leg portions more rigid and thereby enable them to function as highly effective struts for maintaining the handle in its proper relationship to the head 26. The closed relationship of the leg portions 12, shown in FIG. 2, facilitates packaging and minimizes space requirements for shipment. The areas of relative flexibility that are produced by coining, as well as by termination of the stiffening ribs at appropriate points, reliably localize the spreading forces applied for installation, thus avoiding distortion along the lengths of the leg portions and thereby maximizing their compressive strength and appearance.

Figure 5:
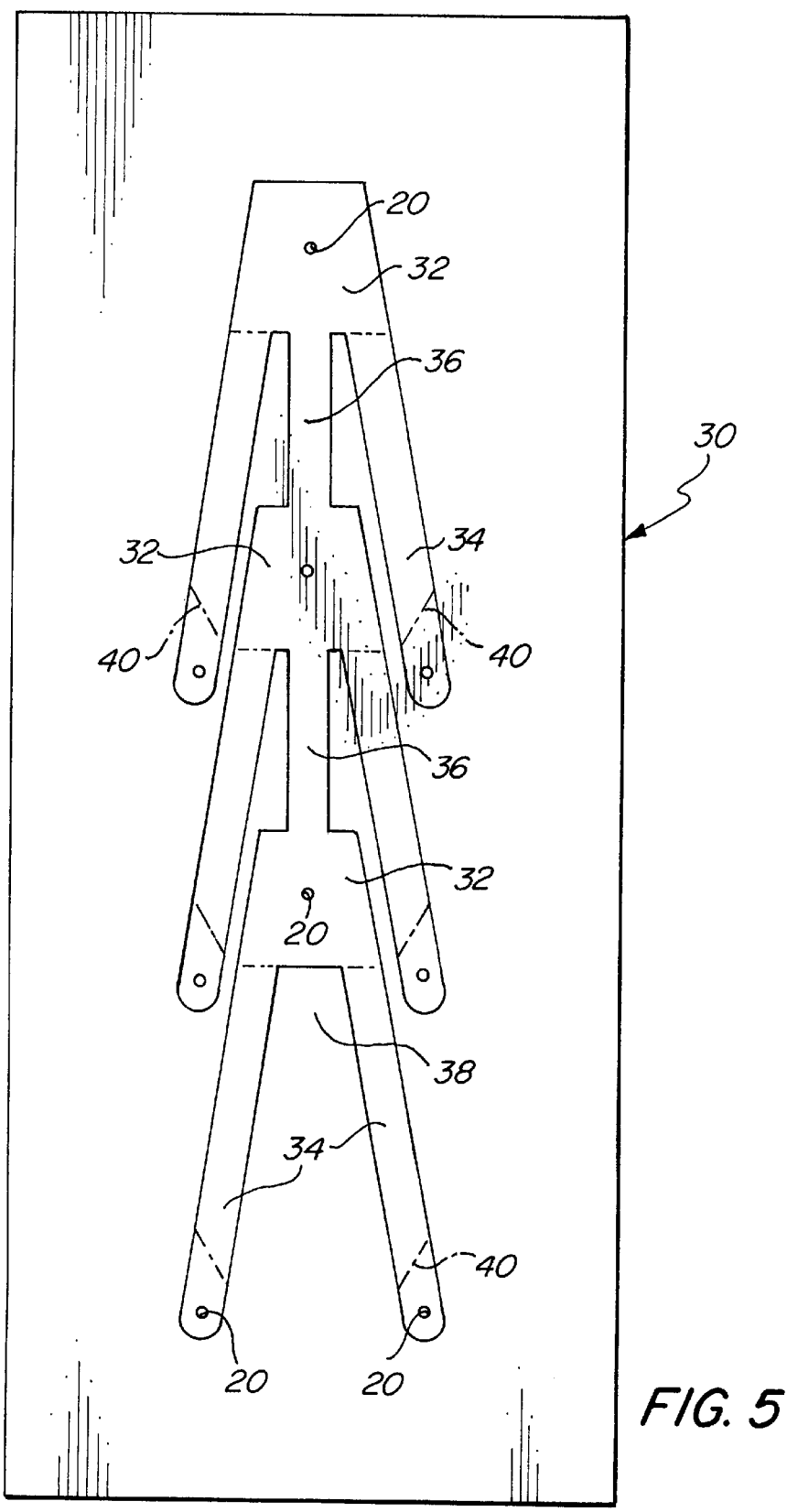
FIG. 5 is a fragmentary plan view of a portion of a flat metal blank from which can be produced braces embodying the invention.

Turning now to FIG. 5 of the drawings, the illustrated metal blank, generally designated by the numeral 30, will produce braces embodying the invention. As can be seen, each of the prospective braces constitutes a V-shaped component that includes a body portion 32 and a pair of divergent leg portions 34, the V-shaped components being arranged in a nested interrelationship and being interconnected by strip elements 36. As will be appreciated, the metal of the blank 30 will normally be stamped with a die that defines the outlines of the prospective braces, and that effects removal of all extraneous metal, as at 38; this may or may not leave intact the interconnecting strip elements 36, for severance in a subsequent operation. Either before or after separation, or in the same stamping operation, the metal of the blank may be coined at 42, so as to produce the lines of reduced thickness shown at 14 in FIGS. 1–4; in the same manner, the U-shaped configuration may be imparted to the body portions 32, the leg portions 34 may be bent at 40, to produce the tab elements 18, and the apertures 20 may be formed. It will also be appreciated that formation of the U-shaped cross section will bring the leg portions 34 into registry with one another, as is best seen by reference to FIGS. 2 and 3.

It will be appreciated that many variations may be made in the construction of the present braces without departure from the underlying concepts of the invention. For example, although metal will usually be employed for fabrication, plastic construction may also be feasible; in such instances, the areas of differential thickness and rigidity would typically be produced in molding operations. Also, while two means for imparting relative flexibility to the leg joints have been illustrated only one (preferably coining) is required, and suitable alternatives may additionally occur to those skilled in the art.

Thus, it can be seen that the present invention provides a supporting brace that is of uncomplicated construction and inexpensive manufacture, that is compact for facile packaging, shipping, and storage, and that is convenient and effective to install and use, being capable of opening to satisfy a wide range of size requirements. The invention also provides a metal blank, and a method utilizing it, by which a plurality of such braces can readily and efficiently be produced.

Having thus described the invention, was is claimed is:

1. A one-piece brace for use in constructing an implement that is comprised of an elongate head and an elongate handle extending perpendicularly to the head, said brace comprising a body portion and a pair of elongate leg portions integrally formed therewith as a single piece, said body portion having a length extending generally on a first axis and being constructed for attachment to the implement handle, said body portion being open ended and of generally U-shaped cross-section along its entire length, in planes perpendicular to said first axis, to permit insertion of the implement handle laterally into said body portion and extension of the handle therethrough, said body portion including a pair of confronting elements lying generally in lateral planes that are spaced to opposite sides of said first axis and that extend generally parallel thereto; said leg portions extending in the same general direction from said confronting elements of said body portion and having attaching elements at the free outer ends thereof for attachment to portions of the operating head that extend laterally to opposite sides of the handle, said brace having a limited area of relative flexibility at the juncture of each of said leg portions with said body portion confronting elements, said areas of relative flexibility providing joints about which said leg portions can turn for displacement laterally away from one another, relative to said first axis, said joints lying substantially in said lateral planes and in a plane that extends transversely of said first axis.

2. The brace of claim 1 wherein said leg portions extend substantially parallel to one another and to said first axis.

3. The brace of claim 1 wherein said areas of relative flexibility comprise lines of reduced thickness, relative to the thickness of adjacent areas, formed into the material of which said brace is fabricated.

4. The brace of claim 3 wherein said material is metal into which said lines of reduced thickness are coined.

5. The brace of claim 1 wherein said areas of relative flexibility are provided by increased stiffening of said leg portions from points adjacent said areas.

6. The brace of claim 5 wherein each of said leg portions is formed with a longitudinally extending rib element to provide said increased stiffening thereof.

7. The brace of claim 1 wherein said leg portions are of substantially equal length, and wherein said attaching elements are tab elements which diverge from one another and from said first axis in the outward direction.

8. The brace of claim 1 wherein said leg portions are wide, taken in planes transverse to said first axis, relative to the thickness of the material of which said brace is fabricated.

9. A one-piece brace for use in constructing an implement that is comprised of an elongate head and an elongate handle extending perpendicularly to the head, said brace comprising a body portion and a pair of elongate leg portions integrally formed therewith as a single piece, said body portion extending generally on a first axis and being constructed for attachment to the implement handle, said body portion including a pair of confronting elements lying generally in lateral planes that are spaced to opposite sides of said first axis and that extend generally parallel thereto; said leg portions being of substantially equal length and extending in the same general direction from said confronting elements of said body portion, each of said leg portions having an attaching tab element formed on the free, outer end thereof for attachment to portions of the operating head that extend laterally to opposite sides of the handle, said tab elements diverging from one another and from said first axis, said brace having a limited area of relative flexibility at the juncture of each of said leg portions with said body portion confronting elements, said areas of relative flexibility providing joints about which said leg portions can turn for displacement laterally away from one another, relative to said first axis, said joints lying substantially in said lateral planes and in a plane that extends transversely of said first axis.

10. The brace of claim 9 wherein said body portion is of generally U-shaped cross section, taken in planes transverse to said first axis.

11. The brace of claim 9 wherein said leg portions extend substantially parallel to one another and to said first axis.

12. The brace of claim 9 wherein said areas of relative flexibility comprise lines of reduced thickness, relative to the thickness of adjacent areas, formed into the material of which said brace is fabricated.

13. The brace of claim 9 wherein said areas of relative flexibility are provided by increased stiffening of said leg portions from points adjacent said areas.

14. The brace of claim 9 wherein said brace is fabricated from a metal blank, and wherein said leg portions are wide, taken in planes transverse to said first axis, relative to the thickness of the material of which said brace is fabricated.

15. A one-piece brace for use in constructing an implement that is comprised of an elongate head and an elongate handle extending perpendicularly to the head, said brace comprising a body portion and a pair of elongate leg portions integrally formed therewith as a single piece, said body portion extending generally on a first axis and being constructed for attachment to the implement handle, said body portion including a pair of confronting elements lying generally in lateral planes that are spaced to opposite sides of said first axis and that extend generally parallel thereto; said leg portions extending in the same general direction from said confronting elements of said body portion and having attaching elements at the free outer ends thereof, with apertures for fasteners, for attachment to portions of the operating head that extend laterally to opposite sides of the handle, said brace having a limited area of relative flexibility at the juncture of each of said leg portions with said body portion confronting elements, said areas of relative flexibility providing joints about which said leg portions can turn for displacement laterally away from one another, relative to said first axis, said joints lying substantially in said lateral planes and in a plane that extends transversely of said first axis.

16. The brace of claim 15 wherein said body is of generally U-shaped cross section, taken in planes transverse to said first axis.

17. The brace of claim 15 wherein said leg portions extend substantially parallel to one another and to said first axis.

18. The brace of claim 15 wherein said areas of relative flexibility comprise lines of reduced thickness, relative to the thickness of adjacent areas, formed into the material of which said brace is fabricated.

19. The brace of claim 15 wherein said leg portions are of substantially equal length, and wherein said attaching elements are tab elements which diverge from one another and from said first axis in the outward direction.

20. The brace of claim 15 wherein said brace is fabricated from a metal blank, and wherein said leg portions are wide, taken in planes transverse to said first axis, relative to the thickness of the material of which said brace is fabricated.

* * * * *